United States Patent
Stanley (10) Patent No.: US 12,243,248 B2
(45) Date of Patent: Mar. 4, 2025

(54) SYSTEMS AND METHODS FOR SUPER REGISTRATION AND PRESERVING SPECTRAL PURITY OF IMAGES

(71) Applicant: PCI Geomatics Enterprises Inc., Markham (CA)

(72) Inventor: David Erik Stanley, Ottawa (CA)

(73) Assignee: PCI Geomatics Enterprises Inc., Toronto (CA)

( * ) Notice: Subject to any disclaimer, the term of this patent is extended or adjusted under 35 U.S.C. 154(b) by 357 days.

(21) Appl. No.: 17/720,970

(22) Filed: Apr. 14, 2022

(65) Prior Publication Data

US 2022/0335632 A1    Oct. 20, 2022

Related U.S. Application Data

(60) Provisional application No. 63/175,177, filed on Apr. 15, 2021.

(51) Int. Cl.
*G06T 7/37*     (2017.01)
*G06T 7/35*     (2017.01)

(52) U.S. Cl.
CPC ................ *G06T 7/37* (2017.01); *G06T 7/35* (2017.01)

(58) Field of Classification Search
None
See application file for complete search history.

(56) References Cited

U.S. PATENT DOCUMENTS

| | | | |
|---|---|---|---|
| 10,937,182 B2* | 3/2021 | Dou ......................... | G06T 7/75 |
| 2017/0089694 A1* | 3/2017 | Groninger .......... | G01N 29/0645 |
| 2019/0239926 A1* | 8/2019 | Pavlovskaia ....... | A61B 17/1703 |
| 2022/0335632 A1 | 10/2022 | Stanley ..................... | G06T 7/33 |
| 2023/0374555 A1* | 11/2023 | Joly ....................... | C10K 3/026 |

* cited by examiner

*Primary Examiner* — Edward Park
(74) *Attorney, Agent, or Firm* — Christopher N. Hunter; Laurie Wright (57) ABSTRACT

Provided are systems and methods for registration and carrying out fine image adjustments of aerial or satellite images to obtain super registered images. Also provided are systems and methods for registration where resampling is minimized or avoided to reduce, minimize, or prevent spectral degradation.

10 Claims, 5 Drawing Sheets

SYSTEMS AND METHODS FOR SUPER REGISTRATION AND PRESERVING SPECTRAL PURITY OF IMAGES

CROSS-REFERENCE TO RELATED APPLICATIONS

The present invention claims priority from U.S. Provisional Application No. 63/175,177 filed on Apr. 15, 2021, the content of which is incorporated herein by reference in its entirety.

TECHNICAL FIELD

The following relates generally to systems and methods for processing imagery. More particularly, the present disclosure relates to systems and methods for registration, mapping, resampling and ortho correction of images, such as satellite or aerial images.

BACKGROUND

Some image processing applications, such as temporal analysis or change detection, require images that are aligned to avoid incorrect or poor quality results. The accuracy of some other image processing applications, such as pixel based classification and hyperspectral analysis, depends on spectral purity of the imagery. In spectrally pure imagery, measurements of colour are the same or close to the original values (i.e., the values from the initial, or source images). Thus, it is important that such original values are not altered, or altered as little as possible, while imagery is corrected to ground co-ordinates by ortho correction (also known as ortho rectification).

When satellite or air borne images are taken, they are distorted and do not match earth co-ordinates. Most of this distortion may be removed using standard techniques for satellite and air photo geometric modeling and ortho correction, but some level of error typically remains. Sources of geometric error include, but are not limited to, errors in geometry, including those due to uncertainty in Tie Points (TPs) and Ground Control Points (GCPs); errors in Digital Elevation Model (DEM); errors in camera lens modeling; and errors due to 'wobble' in a satellite orbital path.

When corrected (ortho) images are stacked on each other and viewed in sequence, imagery often appears to 'jitter' as features move around in seemingly random ways due to such geometric errors. Typically, jitter is sub-pixel, but in some areas can be multiple pixels, which is generally not desirable. Jitter may be reduced or minimized by achieving alignment of about ⅕th to 1/10th (or better) of a pixel across all images in an image stack. Using existing methods, achieving such alignment typically requires highly accurate geometric data which can be difficult and/or expensive to obtain.

It is desirable to develop an improved system and method for processing aerial and satellite imagery.

SUMMARY

In one aspect, provided is a method for registration of an ortho corrected ("ortho") image to a reference ortho image, the method comprising the steps of: a) obtaining the ortho image and the reference ortho image; b) matching the ortho image to the reference ortho image to generate a first set of match points; c) analyzing magnitudes of (x,y) shifts of one or more local windows of data and filtering from the first set of match points one or more blunder match points being outside of a threshold level of misalignment in orientation and/or length with respect to their corresponding points on the reference image to generate a second set of match points containing one or more locations with missing match points; d) populating the one or more locations by interpolation from surrounding valid match points to generate a third set of filtered match points, the valid match points being at or within the threshold level of misalignment; and e) using the third set of match points to resample the ortho image to the reference ortho image to generate a super registered image.

In an implementation, the method further comprises the step of applying Gaussian filtering to the second set of match points between steps c) and d).

In another implementation, the matching algorithm matches the ortho image to a grid of every n'th column and n'th row of the reference ortho image to generate the first set of match points, where n is greater than 1, and the third set of match points is interpolated to have the same dimensions as the reference ortho image.

In yet another implementation, Fast Fourier Transform phase matching is used in step b).

In yet another implementation, analyzing the magnitudes of the (x,y,) shifts in step c) comprises continuously recomputing statistical averages and standard deviations of length and orientation on the one or more local windows of data, and the threshold level is a statistical threshold.

In yet another implementation, the method is carried out N times to obtain a stack of N super registered images, using the same reference image, where N is an integer greater than 1.

In another aspect, provided is a method for registration of an ortho corrected ("ortho") image to a reference ortho image, the method comprising the steps of: a) obtaining a first grid for creating the ortho image from a raw match image and saving the grid; b) obtaining a second grid to match the ortho image to the reference ortho image; c) adding the first and second grids together to obtain a third grid; and d) conducting a single resample of the raw match image using the third grid to obtain a super registered image.

In an implementation, the resampling method is Cubic Convolution, a Sinc Function, or a Modulation Transfer Function.

In another implementation, the method is carried out N times to obtain a stack of N super registered images, where N is an integer greater than 1.

In yet another aspect, provided is method for registration of an ortho corrected ("ortho") image to a reference ortho image, the method comprising the steps of: a) obtaining a first grid to create the ortho image of a match image and saving the grid; b) obtaining a second grid to match the ortho image to the reference ortho image; c) adding the first and second grids together to obtain a third grid; and d) carrying out a Nearest Neighbour method to copy the nearest neighbour pixels from a raw image using the third grid to obtain a super registered image that has not been resampled and retains original spectral values.

In an implementation, the method is carried out N times to obtain a stack of N super registered images, where N is an integer greater than 1.

In yet another aspect, provided is a computing device comprising one or more processors and at least one storage medium, the at least one storage medium containing non-transitory computer-readable instructions for execution by the one or more processors to cause the one or more processors to perform any one of the methods described herein.

In yet another aspect, provided is a system for registration of an ortho corrected image to a reference ortho corrected image, the system comprising: a) a computing device; b) one or more databases containing the ortho corrected image and the reference ortho corrected image; c) one or more job databases for storing a list of jobs to be performed, the jobs comprising scripts including instructions for carrying out the method of any one of the methods described herein and d) one or more processing modules that can be called by the scripts to carry out any one of the methods described herein.

In an implementation, the processing modules have a standard application programming interface (API).

In another implementation, the processing modules are operable to receive input data from local files, databases, memory objects or Web services.

BRIEF DESCRIPTION OF THE DRAWINGS

Embodiments will now be described with reference to the appended drawings wherein.

DETAILED DESCRIPTION

Provided herein are systems and methods for registration (i.e., matching) and carrying out fine image adjustments of aerial or satellite images. Also provided are systems and methods for registration where resampling is minimized or avoided altogether which may reduce degradation of or preserve spectral purity.

As mentioned, DEMs of high accuracy and fine resolution can be very difficult and/or expensive to generate, particularly in remote areas and/or mountainous regions. Satellite imagery often covers entire countries not just areas around cities or towns, and country wide elevation models can be difficult to obtain. Further, if such elevation models are available, and often they are not, they can be expensive to buy (in many countries they are not free) or foreign countries may consider them sensitive for security reasons. Thus, many satellite images are corrected with open source or public domain data which may have a low resolution, such as from 30 m to 5 m (depending on the country).

Obtaining GCPs is also required for ortho correction. Typically, GCP data needs to be much finer in resolution than elevation data. For example, for a 1 m resolution satellite, ground control of 25 cm to 10 cm might be required. Getting such ground control data may be considered expensive outside populated areas since it is often the case that a surveyor must visit the location. With regard to camera distortion, large, expensive satellites which may not be affordable for many, tend to provide accurate distortion information however the multitude of lower cost micro satellites tend to have inaccurate, or no, distortion information.

In addition, it is possible that data from different satellite sensors can be mixed together, or data from the same sensor may be acquired at different times. The input elevation and GCPs improve over time and this can mean that older ortho images may not match precisely with the newer ones because the inputs have changed. The older ortho images could be regenerated from scratch with the new DEM, GCPs, but this may not be practical and still does not guarantee perfect alignment.

The following provides an introduction to the nomenclature used hereinafter to describe the methods of the present disclosure.

An input image (I) can be mapped to an output (resampled) image (O) via the transformation:

$$I \rightarrow O[x_i, y_j] \quad \text{(Equation 1)},$$

where i ranges over the number of columns in the output image and j ranges over the number rows in the output image.

The output image O at pixel location (i,j) may be resampled from the input image I centred at position $[x_i, y_j]$. For example, the output pixel position (2, 3) may have the value $x_2=10.3$; and $y_3=15.1$, which means the output image pixel position (column=2 and row=3) would be resampled from the input image pixel position (column=10.3 and row=15.1). This process is described in greater detail below.

Figure 1:
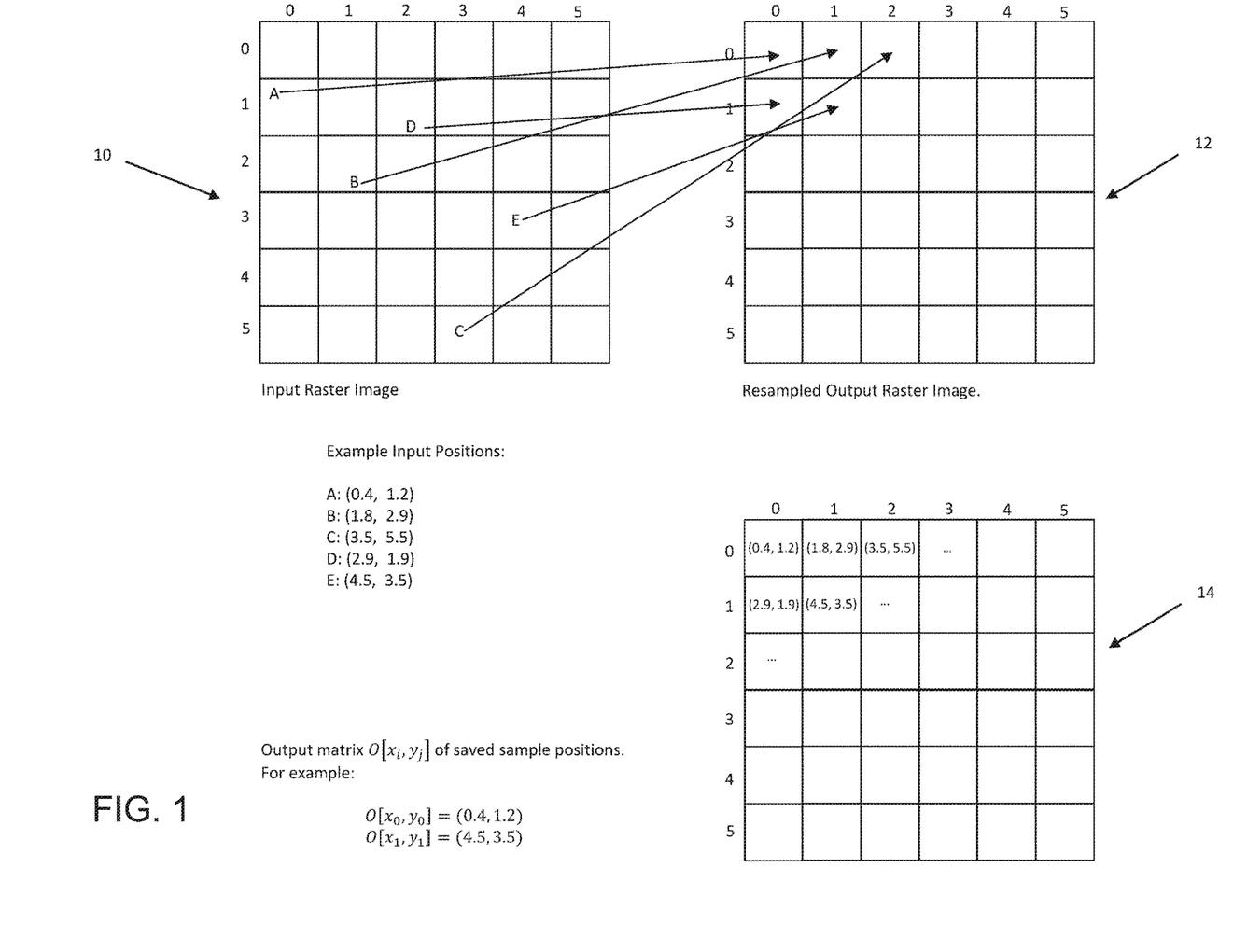
FIG. 1 is a schematic representation of resampling an image.

An example of a resampling method is shown in FIG. 1, where there is depicted an input raster image 2 having input positions: A: (0.4, 1.2); B: (1.8, 2.9); C: (3.5, 5.5); D: (2.9, 1.9); and E: (4.5, 3.5). The input positions may be sampled from the input raster image 10 into an empty raster matrix to create a resampled output raster image 12. An output matrix $O[x_i, y_j]$ (14) of the saved sample positions is also depicted. The resampling method used is independent of this representation. Resampling methods may include, but are not limited to, nearest neighbour, cubic convolution, sinc functions or the modulation transfer function for a particular sensor (if known).

In an ortho image, the mapping (eq. 1) is derived from the sensor geometry (which can include: block bundle adjustments based on GCPs and TPs, camera lens models, camera movement, cartographic projection) and a digital elevation model (DEM). Typically, in the ortho correction process, the mapping (eq. 1) is embedded in the ortho production process and is not explicitly saved, only the resulting output raster image is produced. However, if the mapping is saved explicitly, it can be used to directly generate the ortho product at a later time without the need for knowledge of the sensor geometry or having the DEM available. Since the ortho mapping is being saved, it can be denoted for later use as:

$$I \rightarrow O'[x_i, y_j] \quad \text{(Equation 2)}.$$

Figure 2:
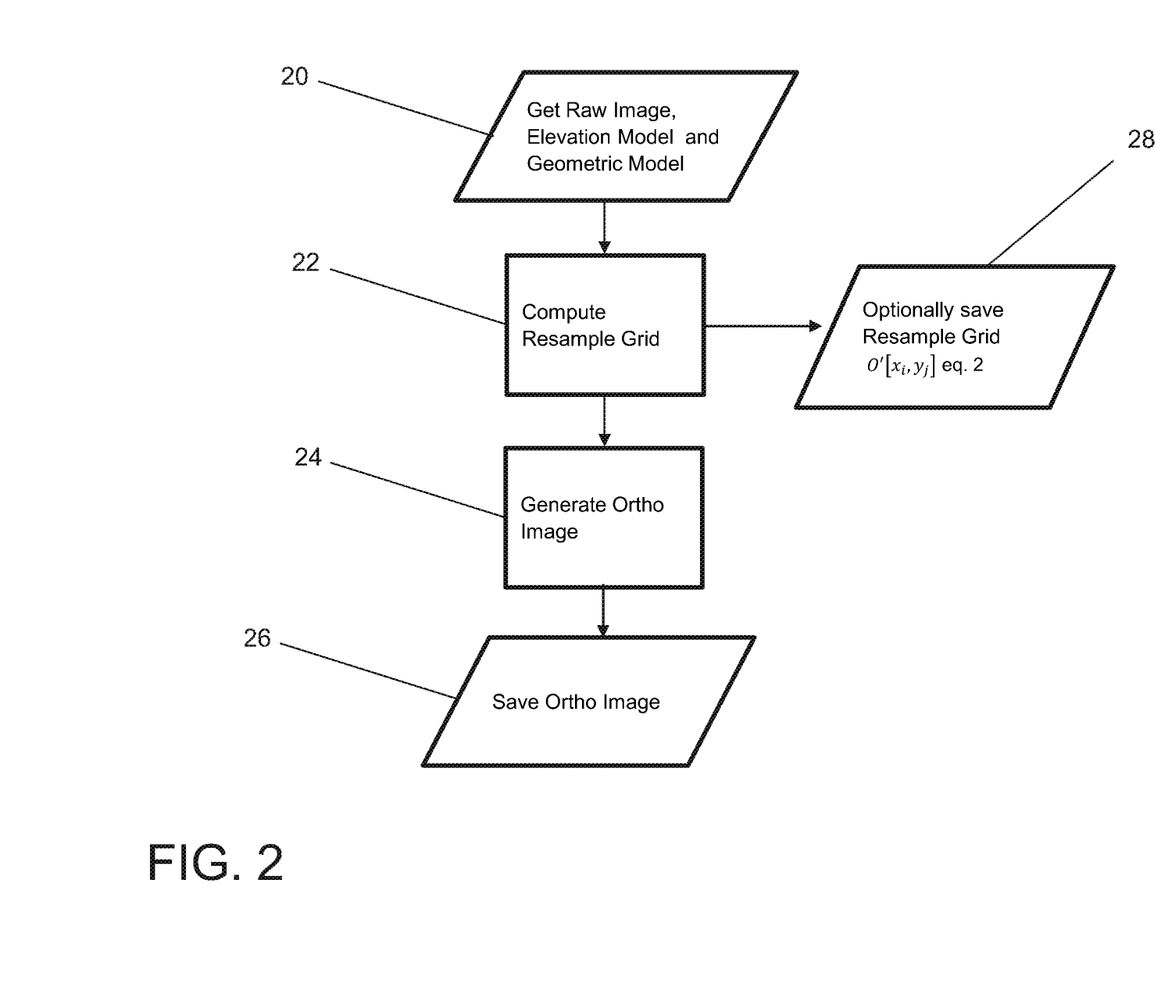
FIG. 2 is a flow chart illustrating a method for generating ortho images.

FIG. 2 illustrates a method of generating an ortho image. First, at step 20, a raw image, DEM and geometric may be retrieved. This may be done by, for example, launching a job on a computing device (not shown), such as a server in a system (not shown) for processing image data. The computing device may run one or more job scripts to call processing modules which may access image data and related data. Generally, such job scripts may include instructions which are executable by the computing device to carry out the image processing methods described herein. Next, at step 22, a resample grid may be computed. Optionally, the resample grid may be saved (step 28) as described above. Using the resample grid, an ortho image may be generated 24, and subsequently saved (26) to, for example, an image database or database server (not shown) to which the computing device has access.

Access to databases and data files is inherent in the operation of most networks and thus the computing device(s) may be located anywhere on a network that communicatively couples the modules and devices described herein. Processing of data may be accomplished by processing modules written in a computer language such as, for example, C or C++. Such modules may be written such that they can transparently accept a variety of data input sources including, but not limited to, local files, network files, databases, passed memory data structures or data from standardized web services. For example, a job script performing ortho correction may have a processing module that can obtain elevation data from a local file and may, as a fall back, be configured to utilize a web service providing Earth elevation data. The scope of the present disclosure is not limited by the nature of the processing modules (many processing modules are known), and the methods described herein may be carried out using various system architectures.

Continuing with respect to ortho correction, in theory, two ortho products of the same resolution and cartographic project should perfectly align. That is, features such as roads, fields, should perfectly lay on top of each other. However, this is often not true in practice. Each ortho image may have its own unmodeled errors. In some areas of each image, alignment may be perfect, and in other areas off by many pixels. Simple corrections, such as a constant shift of an entire image, may not correct the alignment since the errors may vary in complex ways.

The above discussed complex error variation may be addressed by a technique known as dense matching. Given a reference image R and an image M to match to it, a matching algorithm may be used to match points in R to their corresponding points in M. Such matching algorithm may be run by, e.g., a processing module running a job script as described above. While matching every point in R is desirable, it may be too time consuming and/or may require higher computing power than is available. To accelerate matching, match points may be found in a grid of every n'th column and n'th row which may speed up the process by order $n^2$. As described in greater detail below, missing match points between the grid match locations may be interpolated. In practice values of n=8 or n=16 have been found to provide a good balance between speed and ability to model complex error patterns. This may be particularly beneficial when limited computing power is available.

Similar to Equation 1, this transformation can be expressed as:

$$I_M \rightarrow O_R[x_i, y_j] \quad \text{(Equation 3)},$$

where $I_M$ refers to the image to be matched to the reference image R, and $O_R[x_i, y_j]$ refers to the location of the match on the image M.

Figure 3:
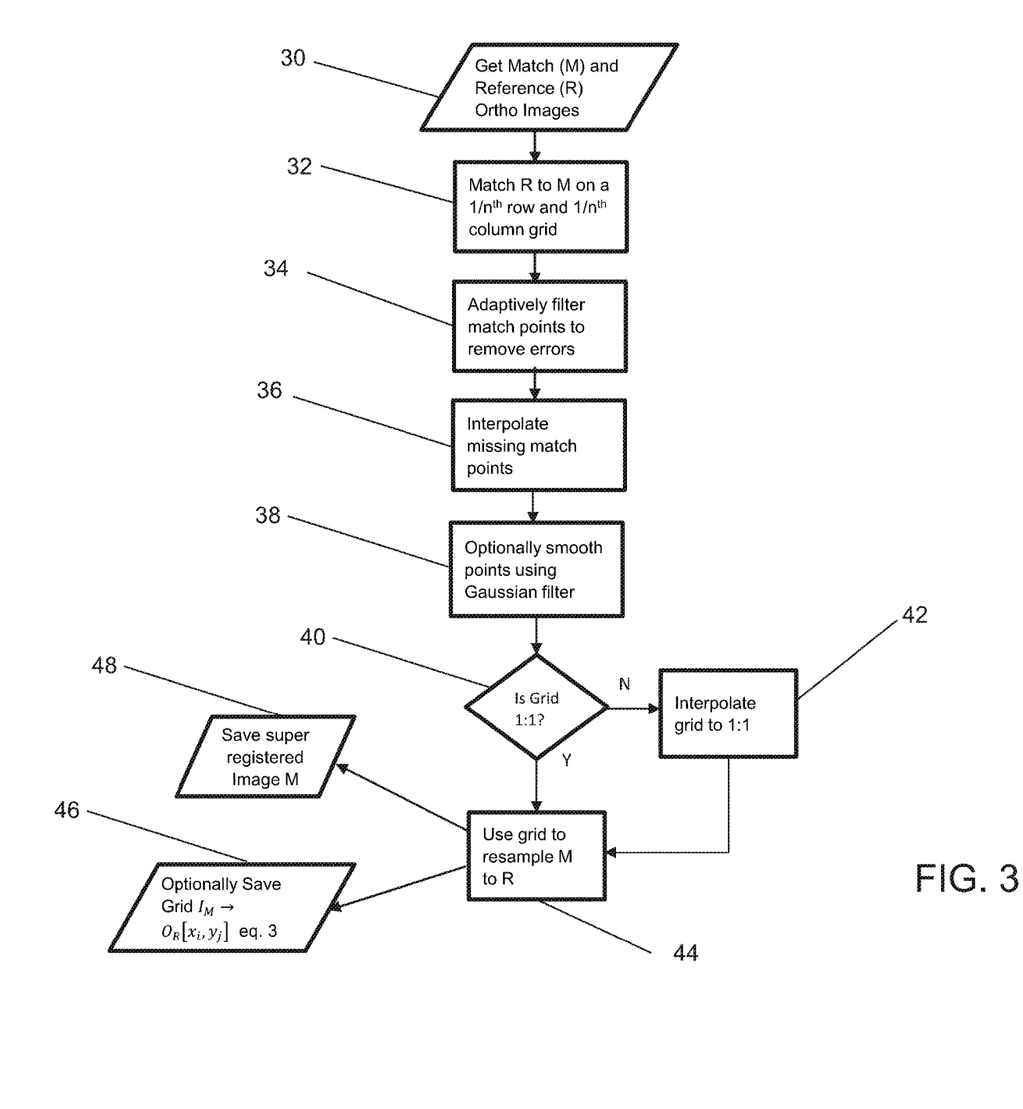
FIG. 3 is a flow chart illustrating a method for matching and adaptively filtering two ortho images to obtain a super registered image.

With reference to FIG. 3, images M and R, though of the same geographic area, will have differences in addition to their similarities. For example, two images may be taken weeks or years apart and features such as new roads may appear, farmers fields may change in crop or shape, trees may die, or water bodies may change level. The matching algorithm may have some level of match failures and blunders (i.e., incorrect matches). Such matching may be carried out at step 32, where image R may be matched to image M on a 1/nth row and a 1/nth column grid. Next, at step 34, the set of match points generated at step 32 may be filtered to remove such blunders. Detecting which points are blunders may be done using an adaptive filtering technique which may analyze the magnitude of the $[x_i, y_j]$ shifts in a local N×N neighbourhood and remove those outside a statistical threshold (for example, 2 sigma). This approach may automatically adapt to the level of misalignment which can vary through the images.

The resulting filtered grid $O_R[x_i, y_j]$ will thus have locations with missing match points. The missing match points may be interpolated from surrounding valid match points (step 36). Such match points may be deemed valid by, for example, being at or below the statistical threshold for misalignment. Other adaptive techniques may be used to identify blunders.

It is desirable that the point matching algorithm is robust to obtain accuracy to the subpixel level. It may be preferable to use Fast Fourier Transform (FFT) phase matching which has been demonstrated in the literature to have accuracies of better than $1/10^{th}$ pixel in appropriate circumstances. Other matching algorithms may also be used. Optionally, the filtered and interpolated grid $O_R[x_i, y_j]$ may be smoothed via a Gaussian filter to remove small scale jitter (step 38).

At step 40, it may be determined whether the filtered grid is 1:1 dimensionally with respect to the reference image R. If the filtered grid is not 1:1, it can be interpolated to be 1:1 at step 42, for example using bi-linear interpolation. Following steps 40 and 42, using the filtered and interpolated grid $O_R[x_i, y_j]$, the match image M may be resampled to match the reference image (44). The grid can then optionally be saved for later use (step 46), and the super registered image M generated at step 44 may be saved (e.g., to a database). Numerous experiments have shown that alignment achieved using this method may be within about $1/5^{th}$ to about $1/10^{th}$ of pixel across the entire image area.

Dense matching tends to be expensive computationally, and thus it can be desirable to avoid 1:1 matching. The above described 1:N matching is N*N (N squared) times more efficient than 1:1 matching. It may be that using 1:N level matching in combination with interpolation of missing points as described above is less computationally expensive as compared to conventional methods for dealing with or avoiding match failure and blunders.

Building on the method described above with respect to FIG. 3, any number, N, of match images ($M_1$, $M_2$, $M_3$, ... $M_N$) may be matched and resampled to a single reference image R. This may create a super matched stack of images in which all N match images are super matched to the reference image and to each other. A super matched stack, which may be highly aligned or nearly perfectly aligned, e.g., within about 1/5th to about 1/10th of pixel), may enable temporal series change detection and analysis algorithms (such as Continuous Change Detection) to be run on the stack with higher accuracy.

Each time a pixel is resampled the spectral purity is degraded and the image becomes "fuzzier". This, in turn, degrades the accuracy of any analysis performed on the image (such as continuous change detection or pixel based classification). Keeping the number of resamples to a minimum to preserve spectral purity is often desirable.

In the above-discussed method, match image M may be resampled two times, once to create the ortho image, and a second time when the ortho image is resampled to match the reference image R.

If the grid to create the ortho image for image M is available (Equation 2), and the grid mapping M to the Reference image R is available (Equation 3), these equations can be chained sequentially as:

$$I_M \to O'_M[x_i, y_j] \to O_R[u_i, v_j] \quad \text{(Equation 4)},$$

where $[u_i, v_j]$ is the same grid meaning as $[x_i, y_j]$ but uses different letters for ease of explanation.

Figure 4:
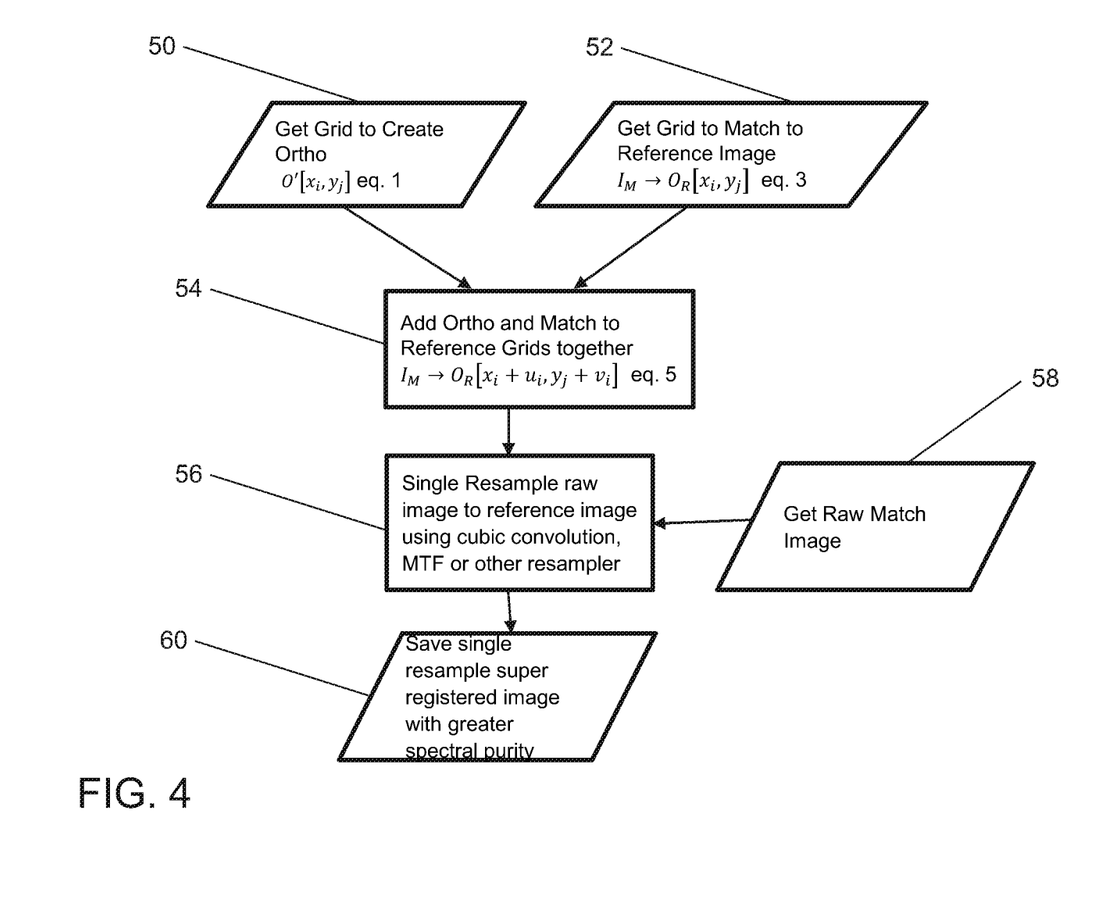
FIG. 4 is a flow chart illustrating a method for matching two ortho images to obtain a super registered image with one resample.

Turning to FIG. 4, the two displacement grids in Equation 4 may be obtained (steps 50 and 52) and added on an element by element basis to output a single displacement grid which combines both the ortho correction and the super registration to the reference image R (step 54). This displacement grid may then be used to perform the two operations in a single resample which may result in greater spectral purity and a less blurry image as compared to if the operations were carried out over two resamples (steps 56 and 58). This given in equation 5 shown below. The resampled super registered image with greater purity may then be saved at step 60. Further, by having the ortho grid (step 50 in FIG. 4) and the match grid (step 52) available for a single resample (step 56), computational efficiency may in some cases be increased as compared to when such operations are not completed in a single step.

$$I_M \to O_R[x_i + u_i, y_j + v_i] \quad \text{(Equation 5)}$$

By repeating the above method, each of any number N of match images ($M_1, M_2, M_3, \ldots M_N$) may be matched and resampled in a single resample to a particular reference image R. This may create a super matched stack of images in which all N match images are super matched to the reference image and to each other and may have greater spectral purity and less blurriness as compared to a stack generated by the method described with respect to FIG. 3, which involves two resampling steps.

Figure 5:
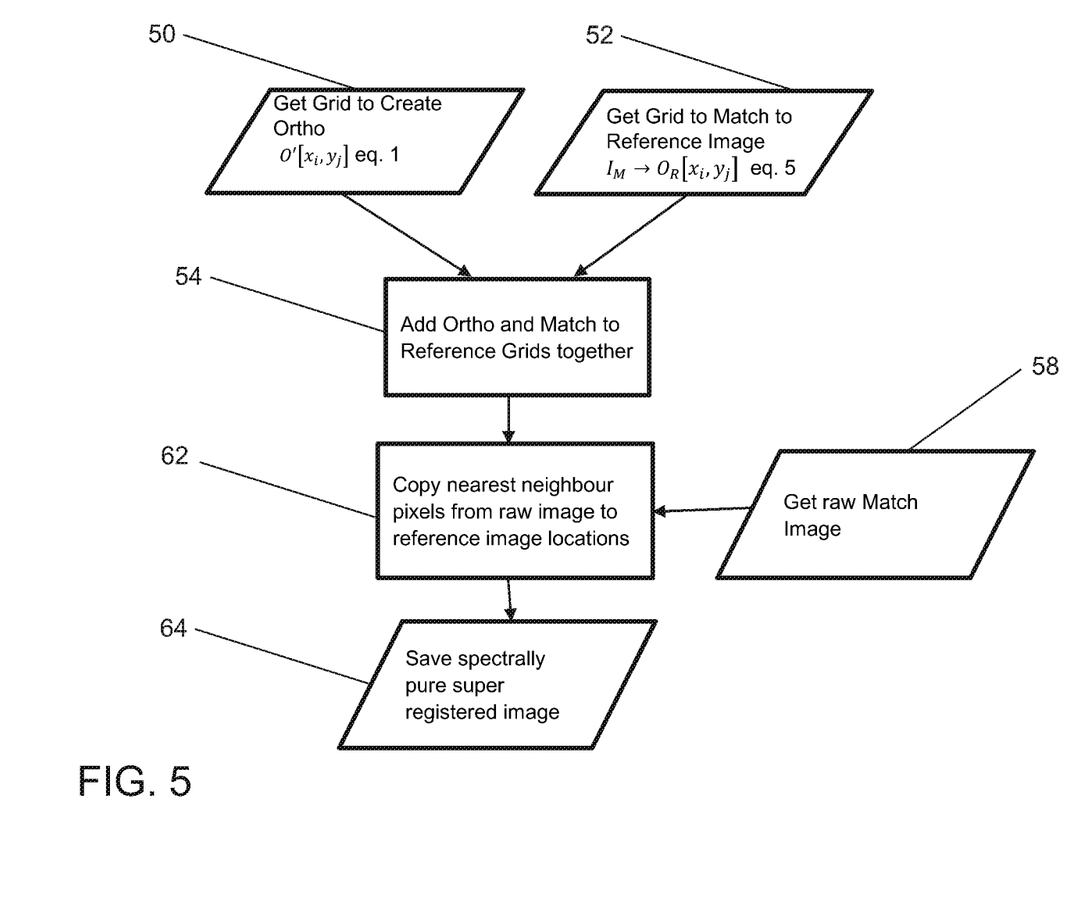
FIG. 5 is a flow chart illustrating a method for matching two ortho images to obtain a super registered, spectrally pure image without resampling.

In some circumstances, the original (unsampled) spectral values are desired, even if this may result in a decrease in positional accuracy. This may be achieved by using Nearest Neighbour resampling which copies the nearest pixel to the resample location as described in Equation 5. As shown in FIG. 5, this method differs from that shown in FIG. 4 at steps 62 and 62. Nearest Neighbour resampling (step 62) may introduce a positional error of up to about plus or minus one half pixel. The resulting increased positional error may still be subpixel and in applications where preserving spectral purity is important, this may be an acceptable trade off. At step 64, the spectrally pure super registered image may be saved.

By repeating the method discussed above and shown in FIG. 5, each of any number N of match images ($M_1, M_2, M_3, \ldots M_N$) may be matched may use nearest neighbour resampling to a single reference image R. Such method may create a super matched stack of images in which all N match images are super matched to the reference image, may be super matched to each other within +/− one half pixel and may have little to no spectral degradation since spectral values are copied rather than combined with neighbouring pixels.

The methods described herein may be embodied in sets of executable machine code stored in a variety of formats such as object code or source code. The executable machine code or portions of the code may be integrated with the code of other programs, implemented as subroutines, plug-ins, add-ons, software agents, by external program calls, in firmware or by other techniques as known in the art.

Any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method for registration of an ortho corrected image to a reference ortho corrected image, the method comprising the steps of:
   a) obtaining the ortho corrected image and the reference ortho corrected image;
   b) matching the ortho corrected image to the reference ortho corrected image to generate a first set of match points;
   c) analyzing magnitudes of (x,y) shifts of one or more local windows of data and filtering from the first set of match points one or more blunder match points being outside of a threshold level of misalignment in orientation and/or length with respect to their corresponding points on the reference image to generate a second set of match points containing one or more locations with missing match points;
   d) populating the one or more locations by interpolation from surrounding valid match points to generate a third set of filtered match points, the valid match points being at or within the threshold level of misalignment; and
   e) using the third set of match points to resample the ortho corrected image to the reference ortho corrected image to generate a super registered image.

2. The method of claim 1, further comprising the step of applying Gaussian filtering to the second set of match points between steps c) and d).

3. The method of claim 1, wherein the matching algorithm matches the ortho corrected image to a grid of every n'th column and n'th row of the reference ortho corrected image to generate the first set of match points, where n is greater than 1, and the third set of match points is interpolated to have the same dimensions as the reference ortho corrected image.

4. The method of claim 1, wherein Fast Fourier Transform phase matching is used in step b).

5. The method of claim 1, wherein analyzing the magnitudes of the (x,y,) shifts in step c) comprises continuously recomputing statistical averages and standard deviations of length and orientation on the one or more local windows of data, and the threshold level is a statistical threshold.

6. The method of claim 1 carried out N times to obtain a stack of N super registered images, using the same reference image, where N is an integer greater than 1.

7. A computing device comprising one or more processors and at least one non-transitory computer readable storage medium, the at least one non-transitory computer readable storage medium containing non-transitory computer-readable instructions for execution by the one or more processors to cause the one or more processors to perform a set of operations, the operations comprising:
   a) obtaining the ortho corrected image and the reference ortho corrected image;
   b) matching the ortho corrected image to the reference ortho corrected image to generate a first set of match points;
   c) analyzing magnitudes of (x,y) shifts of one or more local windows of data and filtering from the first set of match points one or more blunder match points being outside of a threshold level of misalignment in orientation and/or length with respect to their corresponding points on the reference image to generate a second set of match points containing one or more locations with missing match points;
   d) populating the one or more locations by interpolation from surrounding valid match points to generate a third set of filtered match points, the valid match points being at or within the threshold level of misalignment; and
   e) using the third set of match points to resample the ortho corrected image to the reference ortho corrected image to generate a super registered image.

8. The computing device of claim 7, wherein the operations further comprise the step of applying Gaussian filtering to the second set of match points between steps c) and d).

9. The computing device of claim 7, wherein the matching algorithm matches the ortho corrected image to a grid of every n'th column and n'th row of the reference ortho corrected image to generate the first set of match points, where n is greater than 1, and the third set of match points is interpolated to have the same dimensions as the reference ortho corrected image.

10. The computing device of claim 7, wherein Fast Fourier Transform phase matching is used in step b).

* * * * *